United States Patent

[11] 3,601,139

[72] Inventor Edward S. Kontranowski
 Bay City, Mich.
[21] Appl. No. 13,330
[22] Filed Feb. 24, 1970
[45] Patented Aug. 24, 1971
[73] Assignee Aerospace America, Inc.
 Bay City, Mich.

[54] FLUID DISTRIBUTING APPARATUS
 13 Claims, 5 Drawing Figs.
[52] U.S. Cl. ................................................. 137/99,
 137/625.16
[51] Int. Cl. ........................................................ G05d 11/00
[50] Field of Search ............................................. 137/99, .5,
 625.16

[56] References Cited
 UNITED STATES PATENTS
 2,949,924 8/1960 Cochran ........................ 137/99

3,495,610 2/1970 Van Aken ................... 137/99
 FOREIGN PATENTS
 608,831 11/1960 Canada ........................ 137/99

Primary Examiner—Laverne D. Geiger
Assistant Examiner—David J. Zobkiw
Attorney—Learman, Learman and McCulloch ABSTRACT: Apparatus for distributing fluid from a source thereof in predetermined volume to each of a plurality of fluid operated mechanisms comprises a body having a plenum chamber into which the fluid is admitted and from which the fluid passes into any one of a number of separate compartments in each of which is a rotary metering device operable in response to the admission of fluid thereto to enable a measured amount of fluid to be discharged therefrom. Valves are provided for selectively enabling or disabling the admission of fluid to any one or more of the compartments and adjustment of a valve to disable the admission of fluid to any compartment automatically effects disablement of the associated metering device.

PATENTED AUG 24 1971 3,601,139
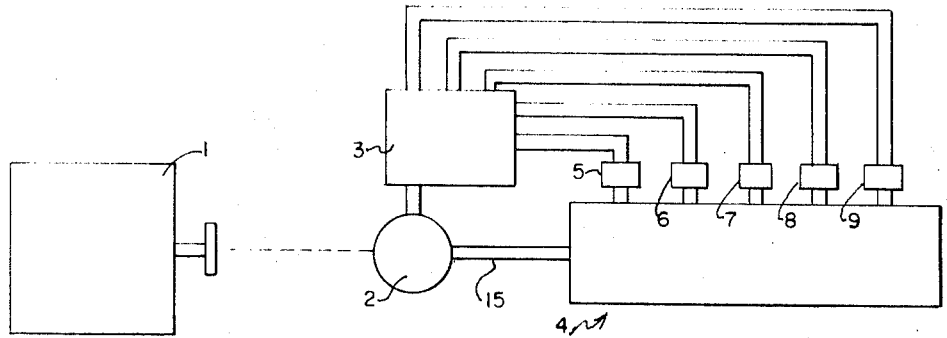
FIG. 1
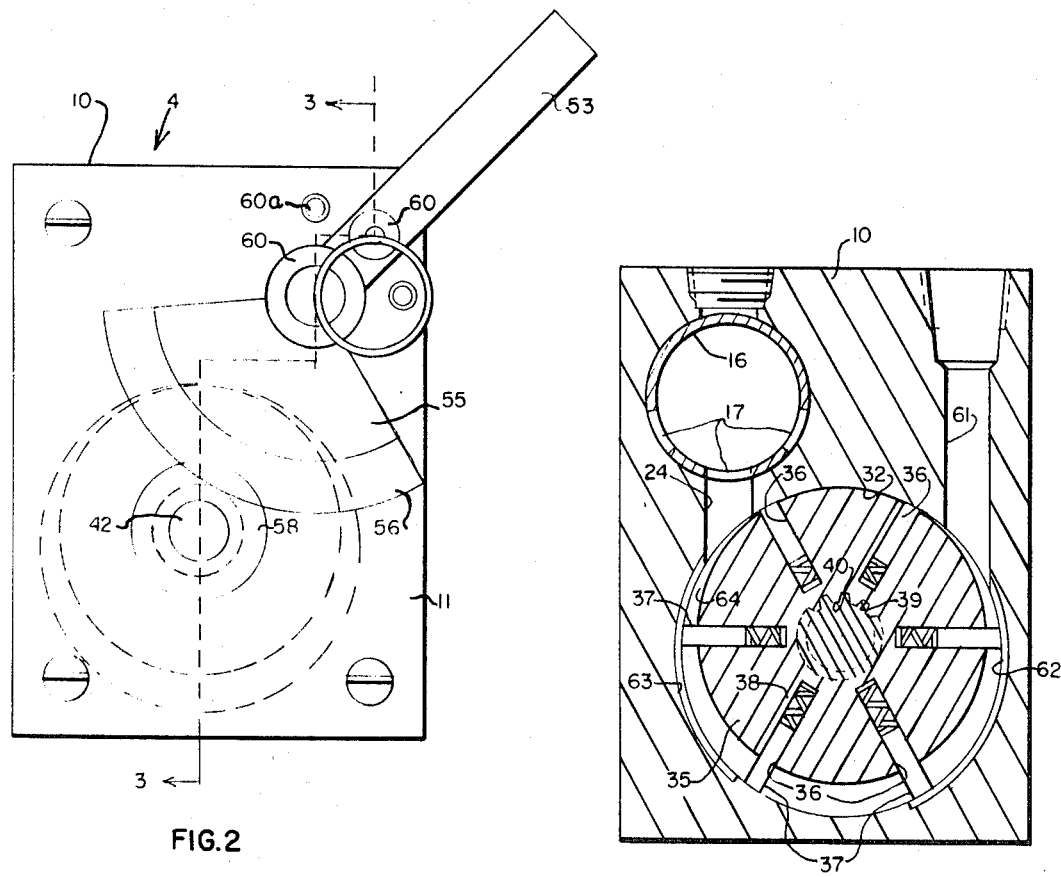
FIG. 2
FIG. 5
INVENTOR.
EDWARD S. KONTRANOWSKI INVENTOR.
EDWARD S. KONTRANOWSKI
BY Leaman, Leaman &
McCulloch

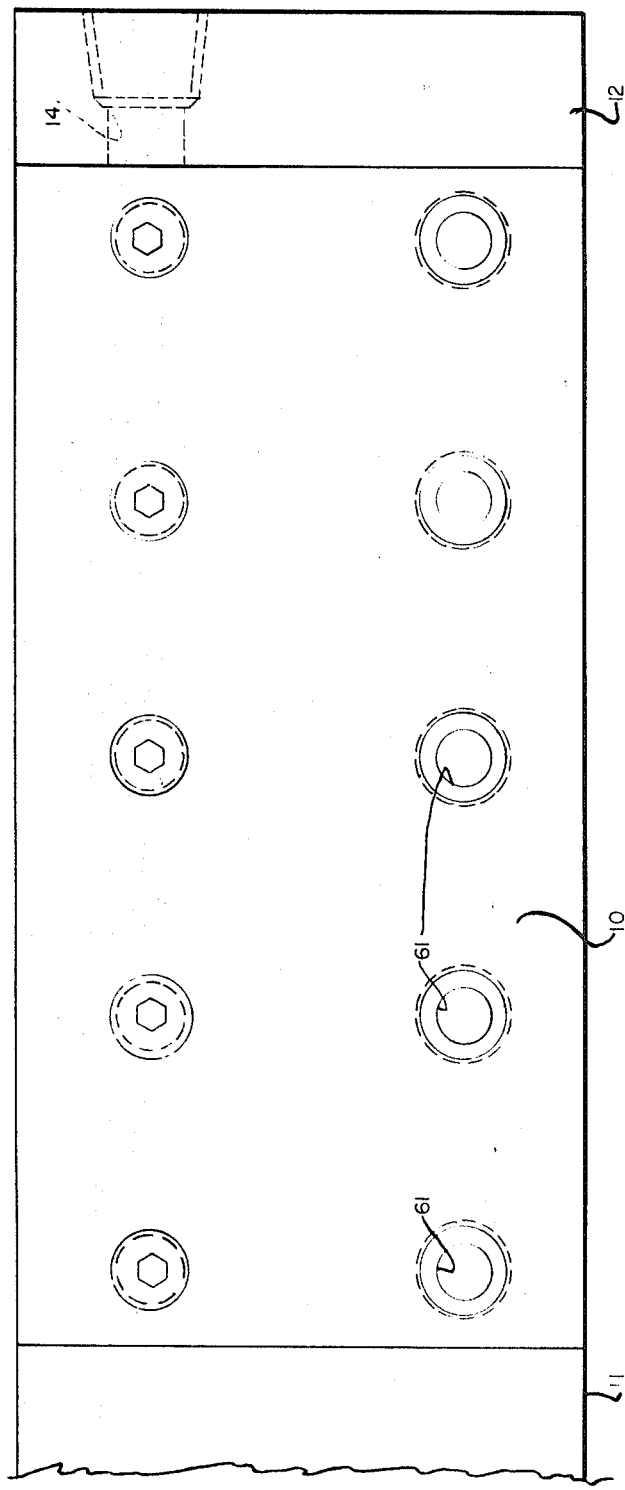

FLUID DISTRIBUTING APPARATUS

The invention disclosed herein relates to fluid distributing apparatus and more particularly to a multicompartment housing adapted to receive pressure fluid from a pump or the like and to discharge fluid from any selected number of the compartments in predetermined quantities. Apparatus constructed in accordance with the invention is especially adapted for use with hydraulic driving mechanisms each of which is capable of being operated independently of or in conjunction with any of the others.

The prior art includes many disclosures of vehicles adapted for use both on and off highways and includes many kinds of different wheel driving mechanisms for such vehicles. For best results, the operator of the vehicle should be able to vary the number of wheels to which driving force is applied so as to enable the vehicle to be adapted to the terrain over which it is driven. Thus, it sometimes is desirable to drive all four wheels of a vehicle, whereas in other instances it may be more desirable to drive only two or even one of the wheels. In vehicles of the kind intended to be driven on surfaces other than roads and highways, it is desirable that each wheel be capable of being driven independently of the others so as to enable the vehicle to be propelled even though only one of the wheels can obtain traction. Although such a result can be achieved by providing completely independent driving and drive transmitting apparatus for each of the vehicle's wheels, such an arrangement is expensive due to the multiplication of parts required. Another disadvantage of such an arrangement is that synchronization of the driving speeds of the several wheels is difficult to maintain.

Hydraulic drive mechanisms for vehicles have been proposed heretofore but hydraulic systems have characteristics which have rendered them unsuitable for use unless each driving wheel is provided with completely independent driving mechanism. The principal disadvantageous characteristic of hydraulic drive mechanisms is that the hydraulic fluid follows the path of least resistance. Thus, if a multiple wheel hydraulic drive system is provided, a wheel which has less traction than another will absorb all of the driving force, thereby resulting in disablement of the vehicle if one of the driving wheels is unable to obtain traction.

An object of this invention is to provide fluid distributing apparatus for a multiple-wheel driving mechanism for vehicles and other purposes and which overcomes the disadvantages of previously known mechanisms designed for similar uses.

Another object of the invention is to provide pressure fluid distributing apparatus for pressure fluid drive mechanisms of the kind referred to and which is capable of providing driving power to all mechanisms regardless of the load to which they are subjected.

A further object of the invention is to provide fluid driving apparatus for a multiple wheel vehicle and which is capable of providing driving power to any one or more of the wheels.

Other objects and advantages of the invention will be pointed out specifically or will become apparent from the following description when it is considered in conjunction with the appended claims and the accompanying drawings, in which:

FIG. 1 is a diagrammatic view of a closed hydraulic system incorporating apparatus constructed in accordance with the invention;

FIG. 2 is an end elevational view of distributing apparatus constructed in accordance with the invention;

FIG. 4 is a top plan view of the apparatus shown in FIG. 3; and

FIG. 5 is a sectional view, on a reduced scale, taken on the line 5—5 of FIG. 3.

Figure 3:
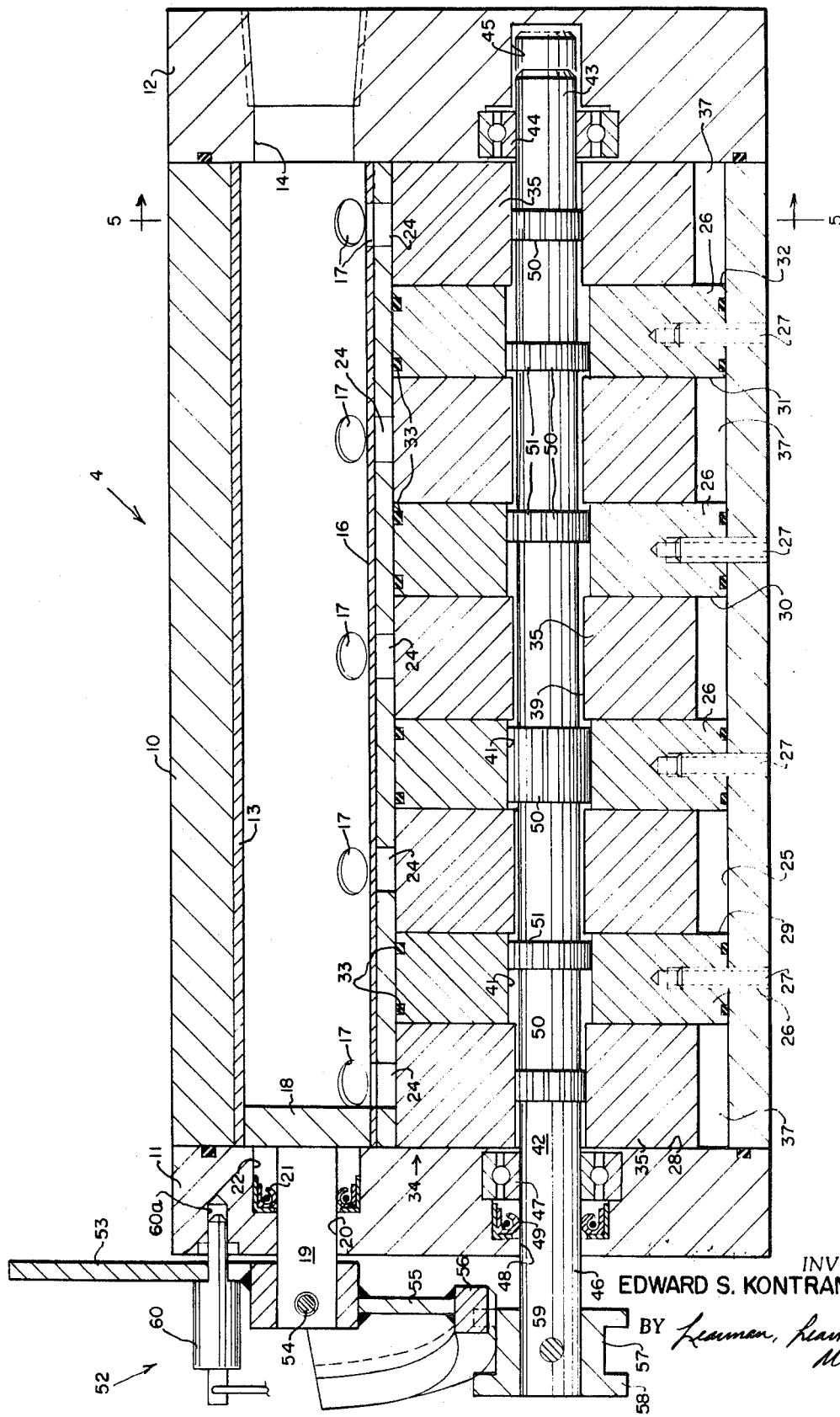
FIG. 3 is an enlarged sectional view taken on the line 3—3 of FIG. 2.

Apparatus constructed in accordance with the invention is adapted for use in conjunction with a vehicle driving system having either an internal combustion engine or an electric motor 1 that is coupled to and drives a fluid pump 2 which is adapted to pump fluid from a reservoir 3 to distributing apparatus 4 from which the fluid may pass to hydraulic motors 5, 6, 7, 8 and 9 from which the fluid returns to the reservoir 3. The hydraulic motors 5–9 may be of any one of a number of commercially available motors and four of them may be mounted in such manner as to drive each of the four wheels of a vehicle in a manner such as that disclosed in copending application Ser. No. 801,254, filed Feb. 24, 1969, and owned by the assignee of this application. The fifth driving motor, such as the motor 7, may form part of a power takeoff unit associated with the vehicle.

The distributing apparatus 4 comprises a body or housing 10 having end caps 11 and 12 at its opposite ends. Formed in the body 10 is an elongated chamber 13 which communicates at one end with a port 14 that is adapted to accommodate one end of a fluid conduit 15, the opposite end of which is coupled to the discharge side of the pump 2. Rotatably fitted into the chamber 13 is a sleeve valve 16 having a plurality of ports, some of which are shown at 17 in FIGS. 3 and 5. That end of the valve 16 which is adjacent the end wall 11 is secured to a disc 18 carried at one end of a shaft 19 which passes through an opening 20 formed in the end wall 11. A seal 21 is fitted between the shaft 19 and a counterbore 22 in the wall 11.

The body 10 is provided with an axial bore 25 within which is mounted a plurality of separators or discs 26 that are fixed in axially spaced position by pins 27 so as to divide the bore into a plurality of equal size compartments 28, 29, 30, 31 and 32. Seals 33 are interposed between each separator 26 and the wall of the bore 25. An inlet passage 24 establishes communication between the chamber 13 and each of the compartments.

Rotatably mounted in each compartment is an identical metering device 34 comprising an annular, disclike body 35 of smaller diameter than that of the bore 25 and provided with a plurality of radially extending slots 36 in each of which is a radially movable metering vane 37. The radial depth of the slots 36 is greater than the corresponding length of the vanes 37 so as to permit movement of the vanes inwardly and outwardly of the slots and each vane is urged radially outwardly by a spring 38. Each disc 35 fits snugly, but rotatably, within its associated compartment and the width of each vane corresponds to the width of the associated disc.

Each of the meter discs 35 has a central opening 39 which is axially splined to provide a plurality of teeth 40. Each of the separator members 26 also is provided with an opening 41, but the openings 41 are eccentric and have smooth bores. Extending through the openings in the separators and the meter discs is a shaft 42, one end 43 of which is journaled in a bearing 44 and projects into a socket 45 formed in the end wall 12. The opposite end 46 of the shaft 42 is journaled in bearings 47 and projects through an opening 48 in the end wall 11. A seal 49 surrounds the shaft 42 outboard of the bearings 47.

Means is provided for selectively coupling and uncoupling the meter discs 35 to and from the shaft 42 and comprises a plurality of axially spaced enlargements 50 on the shaft 42, each of the enlargements having spline teeth 51 thereon which are adapted to be engaged with and disengaged from the teeth 40 formed on the discs 35. The spacing and axial lengths of the splined enlargements 50 are such as to enable selected ones of the discs 35 to be coupled to and uncoupled from the shaft 42 in response to axial adjustment of the latter.

Operating means 52 is provided for simultaneously adjusting the valve 16 and the shaft 42 and comprises a lever 53 which is pinned as at 54 to the valve shaft 19 and which carries a sector-shaped flange 55 terminating at its free end in a cam 56 that is accommodated in an endless groove 57 formed in a cam follower 58 that is pinned as at 59 to the end 49 of the shaft 42. The arrangement is such that rotary movement of the lever 53 imparts simultaneous rotation to the valve 16 and axial shifting of the shaft 42. Such rotation of the valve 16 will register selected ones of the ports 17 with the inlets 24 leading into the compartments 28–32, and will effect driving engagement of the spines 50 with the spline teeth of those discs 35 which occupy the compartments into which fluid may be delivered from the valve 16. A pin 60 is carried by the lever 53 and is adapted to be fitted into any one of a number of openings 60a so as to fix the operating means 52 in any selected position of adjustment.

Each of the compartments 28–32 has an outlet passage 61 the inner end of which communicates with the bore 25 and the outer end of which is adapted to receive a conduit which leads to one of the hydraulic motors 5–9. Each outlet 61 has associated with it an arcuate groove 62 formed in the fore 25, and a similar arcuate groove 63 is associated with each of the inlets 24. Each of the hydraulic motors 5–9 is coupled to a fluid conduit for delivering fluid from the associated motor to the reservoir 3.

When the parts of the apparatus are in the positions shown in the drawings, the ports 17 at opposite ends of the valve 16 register with the inlets 24 leading into the two end compartments 28 and 32, but the valve 16 closes the inlets of the remaining compartments. The shaft 42 is in such position that the splined enlargements 50 adjacent opposite ends of the shaft are in mesh with the spline teeth 40 of the metering discs 35 in the two compartments 28 and 32, but the remaining splined enlargements are free from their associated discs. In these positions of the valve 16 and the shaft 42, operation of the motor 1 in such manner as to drive the pump 2 will cause fluid to be delivered from the reservoir 3 into the valve 16 which will become filled with fluid so as to function as a plenum chamber. Fluid may pass from the interior of the valve 16 into either of the compartments 28 or 32, but no fluid will be admitted to the other compartments because their inlets are sealed by the valve 16.

Although each disc 35 is rotatable about its center, it is eccentric with respect to the bore 25. Each of the vanes 37, however, is urged by its associated spring 38 into engagement with the surface of the bore. The arrangement is such that a generally wedge-shaped, arcuate space or chamber 64 (see FIG. 5) is defined between each disc 35 and the wall of the bore 25 and into which fluid from the associated inlet 24 passes. The arcuate length of the chamber 64 is constant and is defined by two adjacent vanes 37, but the volume of the chamber constantly varies as the disc rotates.

Fluid admitted to the chamber 64 from the inlet 24 exerts a force on the vane 37 at the larger end of the chamber 64 so as to impart rotation to the disc 35. Rotation of the disc 35 at either end of the body 10 will be transmitted via the shaft 42 to the other disc 35 so as to drive the latter in the same direction and at the same speed.

As either disc 35 rotates, the volume of the associated chamber 64 initially will expand, thereby enabling additional fluid to be accommodated therein, and subsequently the volume will contract. The groove 63 permits additional fluid to be delivered to the chamber 64 so as to prevent cavitation. Fluid in the chamber 64 will be propelled by the vanes 37 toward the outlet 61, the groove 62 serving to prevent the building of excessive pressure due to contraction of the chamber 64.

Fluid discharged from the compartment 32 will drive the hydraulic motor 9 and fluid discharged from the compartment 28 will drive the fluid motor 5. Since the disc 35 in the compartment 32 rotates, and since both compartments are of the same size and are in communication with the plenum chamber formed by the valve 16, the amount of fluid discharged from the compartment 28 will be the same as that discharged from the chamber 32. Consequently, the fluid motor 5 will be driven at the same speed as that of the motor 9. This result is assured, even though the load on the motor 9 may be much less than that on the motor 5, inasmuch as rotation of the disc 35 in the compartment 28 will cause a low pressure to exist at the inlet 24 each time a vane passes the inlet.

If the motors 5 and 9 are drivingly connected to the rear wheels of a vehicle and should only one of such wheels have traction, the lack of traction of the other wheel will have no effect on the wheel with traction, inasmuch as its driving motor will effect driving rotation of that wheel without regard to the freedom of the other wheel to slip.

If the lever 53 is rotated counterclockwise from the position shown in FIG. 2 to a position in which all five of the ports 17 register with their associated inlets 60, the shaft 42 will be shifted to the left so as to engage the splined enlargements 50 with the spline teeth of all five of the discs 35, whereupon fluid will be delivered from the plenum chamber formed by the valve 16 through all of the compartments 28–32 so as to drive all of the motors 5–9. In each instance, each of the discs 35 will be driven at a uniform rate of speed, thereby enabling the quantity of fluid discharged from the respective compartments to be uniform.

The number and arrangement of the ports 17 in the valve 16 and the arrangement of the splined enlargements 50 are such as to permit any one or more of the metering devices 34 to be operated either to the exclusion of or in conjunction with the others.

Although each of the compartments 28–32 is illustrated as being of the same size so as to enable equal quantities of fluid to be discharged therefrom, it will be understood that the sizes of the compartments may vary so as to enable the quantity of fluid discharged from one compartment to be greater or less than the quantity of fluid discharged from any other compartment.

The disclosed embodiment is representative of a presently preferred form of the invention, but is intended to be illustrative rather than definitive thereof. The invention is defined in the claims.

I claim:

1. Fluid distributing apparatus comprising means forming a plurality of separate compartments each of which has a fluid inlet and a fluid outlet; means for admitting fluid from a source thereof to each of said inlets; rotary means in each of said compartments rotatable in response to the admission of fluid thereto; metering means carried by each of said rotary means and responsive to the speed of rotation thereof to regulate the quantity of fluid discharged from said compartments via their associated outlets; means for coupling the rotary means of selected compartments for conjoint rotation at the same speed; valve means interposed between said source and each of said inlets; and means for operating said valve means for selectively enabling and disabling fluid transfer from said source to a selected number of said inlets.

2. Apparatus as set forth in claim 1 wherein said admitting means comprises a plenum chamber between said source and said inlets.

3. Fluid distributing apparatus comprising a body having therein a plurality of separate compartments each of which has a fluid inlet and a fluid outlet; valve means for selectively enabling and disabling the admission of fluid from a source thereof to a selected number of said compartments via their inlets; independent metering means in each of said compartments operable in response to the admission of fluid thereto for discharging a metered quantity of fluid from each of said compartments through its associated outlet; and means for coupling the metering means of said selected number of compartments for conjoint operation whereby the quantity of fluid discharged from any one of said selected compartments has a predetermined relation to the quantity of fluid discharged from any other of said selected number of compartments.

4. Apparatus as set forth in claim 3 wherein each of said compartments is of the same size.

5. Apparatus as set forth in claim 3 wherein said coupling means includes a shaft extending through each of said compartments, driving means on said shaft, and driven means on said metering means in driving engagement with said driving means.

6. Apparatus as set forth in claim 5 wherein said coupling means includes means for shifting said shaft to effect selective engagement and disengagement of said driving means and said driven means.

7. Apparatus as set forth in claim 6 including control means for controlling said valve means, and means coupling said control means and said shifting means for conjoint operation.

8. Fluid distribution apparatus comprising a body having a plurality of separate compartments therein, each of said compartments having an inlet and an outlet; manipulatable valve means for admitting fluid from a source thereof to any selected number of said compartments via the associated inlets; means in each of said compartments operable to meter the flow of fluid therethrough from its associated inlet to its associated outlet; and coupling means responsive to operation of the meter means in any one of said compartments to operate the meter means in the remainder of said selected number of compartments whereby the volume of fluid discharged from each of said compartments is directly related to the volume of fluid discharged from said one of said compartments, said coupling means comprising a shaft having driving means thereon, said shaft being axially movable into and out of driving engagement with selected ones of said meter means.

9. Apparatus as set forth in claim 8 including means operable to manipulate said valve means and to move said shaft simultaneously.

10. Fluid distributing apparatus comprising a body having a plurality of separate compartments therein each of which has a fluid inlet and a fluid outlet; means for delivering fluid from a source thereof to each of said compartments via their associated inlets; rotary metering means in each of said compartments and operable in response to the admission of fluid thereto to regulate the quantity of fluid discharged therefrom via their associated outlets; and means for selectively coupling and uncoupling a selected number of said metering means for conjoint rotation of the coupled metering means.

11. The apparatus set forth in claim 10 wherein said fluid delivering means includes a plenum chamber in said body.

12. The apparatus set forth in claim 11 including manipulatable valve means in said plenum chamber operable to enable and disable the admission of fluid to a selected number of said inlets.

13. The apparatus set forth in claim 10 wherein said coupling and uncoupling means comprises a shaft having a number of driving members thereon corresponding to the number of said metering means, said shaft being axially movable relatively to said metering means to connect and disconnect said driving members with the respective metering means.